United States Patent
Kemper (10) Patent No.: US 9,819,162 B2
(45) Date of Patent: Nov. 14, 2017

(54) POWER TRANSMISSION SYSTEM FOR LONG TRAVEL DISTANCES HAVING A GUIDE CHANNEL

(71) Applicant: TSUBAKI KABELSCHLEPP GMBH, Wenden-Gerlingen (DE)

(72) Inventor: Uwe Kemper, Kreuztal (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 0 days.

(21) Appl. No.: 14/647,314

(22) PCT Filed: Nov. 6, 2013

(86) PCT No.: PCT/EP2013/073148
§ 371 (c)(1),
(2) Date: May 26, 2015

(87) PCT Pub. No.: WO2014/082824
PCT Pub. Date: Jun. 5, 2014

(65) Prior Publication Data
US 2015/0303665 A1   Oct. 22, 2015

(30) Foreign Application Priority Data
Nov. 28, 2012  (DE) .................. 10 2012 111 542

(51) Int. Cl.
| | |
|---|---|
| *F16L 3/08* | (2006.01) |
| *H02G 3/04* | (2006.01) |
| *F16G 13/16* | (2006.01) |
| *H02G 11/00* | (2006.01) |
| *F16L 3/015* | (2006.01) |

(52) U.S. Cl.
CPC ............ *H02G 3/04* (2013.01); *F16G 13/16* (2013.01); *F16L 3/015* (2013.01); *H02G 11/006* (2013.01); *H02G 3/0437* (2013.01)

(58) Field of Classification Search
CPC ........... F16G 13/16; H02G 11/00; H02G 3/04
See application file for complete search history.

(56) References Cited

U.S. PATENT DOCUMENTS

| | | | |
|---|---|---|---|
| 3,157,376 A | 11/1964 | Merker et al. | |
| 3,291,921 A * | 12/1966 | Waninger | B66C 13/12 191/12 C |
| 8,061,493 B2 * | 11/2011 | Kemper | F16G 13/16 191/12 C |

FOREIGN PATENT DOCUMENTS

| | | |
|---|---|---|
| DE | 10053635 A1 | 5/2002 |
| DE | 102004038817 A1 | 3/2005 |

(Continued)

*Primary Examiner* — Amy Sterling
(74) *Attorney, Agent, or Firm* — BainwoodHuang (57) ABSTRACT

A power conducting system has at least one power conducting unit for guiding lines, cables, hoses or the like between a stationary connection area and a moving connection area, with a curved region being formed between a lower run and an upper run, the power conducting unit having segments that are connected together in an articulated manner. Some segments have laterally arranged rollers with different track widths, wherein the rollers roll on guides. The guides have cutouts so that rollers can pass through the guides at each particular deflection point of the power conducting unit. The guides form lateral boundaries of a guide channel for the lower run.

13 Claims, 5 Drawing Sheets

(56) References Cited

FOREIGN PATENT DOCUMENTS

| DE | 202006006665 U1 | 7/2006 |
|----|-----------------|--------|
| DE | 102006049434 A1 | 4/2008 |

* cited by examiner

POWER TRANSMISSION SYSTEM FOR LONG TRAVEL DISTANCES HAVING A GUIDE CHANNEL

The subject matter of the invention relates to a power conducting system having at least one power conducting unit for guiding lines, cables, hoses or the like between a stationary connection area and a moving connection area.

Power conducting units are known for guiding lines, cables, hoses or the like between a stationary connection point and a moving connection point. By means of a power conducting unit, cables, lines, hoses and the like are guided to consumers. These can be for example machine parts, cranes etc. Consumables, power or the like are transported from a preferably stationary connection to a moving connection of the consumer by means of the cables, lines or hoses. The power conducting unit can be single-run or multiple-run.

Various configurations of power conducting units are known. The designation power conducting chain is understood to mean for example a power conducting unit which is formed from individual links that are connected together in an articulated manner. The links have parallel plates and transverse webs connecting the plates.

Another embodiment of a power conducting unit has a support strip to which plates are indirectly or directly connected. Such a power conducting unit can be produced for example in that first a channel is extruded from a plastics material and the channel is subdivided into segments by cuts, wherein the support strip remains intact.

In the case of long travel distances, there is the problem that the frictional forces between the upper run and lower run can become very large. In particular, on account of the dead weight of the power conducting unit and of the weight of the lines and cables or hoses which are arranged in the power conducting unit, these can be exposed to high mechanical stresses. The energy required to move the power conducting unit is relatively great.

In order to improve the functionality of the power conducting unit and the travel distances, it is known to arrange a support carriage between an upper run and a lower run of the power conducting unit, such that the upper run is moved on the support carriage.

It is known that for example by way of sliding shoes, as they are known, which are arranged on at least some segments of the power conducting unit, the frictional resistance between those regions of the runs that rub against one another can be reduced.

WO 99/57457 discloses a power conducting unit which has chain links that are connected together in an articulated manner. Rollers are provided on at least some chain links. The arrangement of the rollers allows the upper run to move on the lower run, wherein the rollers support the upper run on the lower run.

A problem with such a configuration of the power conducting unit is that while the upper run is being moved, the rollers have to be moved over one another. This results in not inconsiderable noise generation, which is undesired. While the rollers are being moved, jolts are also introduced into the upper run and these can result in undesired vibrations of the power conducting unit.

In self-supporting power conducting units, it is known that the upper run is moved on a support structure. The U.S. Pat. No. 3,157,376 describes such a support structure. The latter has rails which are fastened to supports. The chain links of the power conducting unit are provided with rollers with different track widths. Some of the chain links are provided with rollers which have a small track width. Other chain links are provided with rollers which have a larger track width. The guide rails are arranged one above another, since the rollers are arranged next to the upper or lower edge of the upper run. The guides have apertures through which the rollers can pass.

A problem with such an arrangement of the power conducting unit is that there is a not inconsiderable space requirement. Furthermore, not inconsiderable technical complexity has to be involved, since run-on slopes have to be provided at the cutouts in the guides, as can be gathered in particular from FIG. 1 of U.S. Pat. No. 3,157,376.

Proceeding herefrom, the objective of the present invention is to specify a power conducting system which is easier to produce and which has a small space requirement.

This object is achieved according to the invention by a power conducting system having the features disclosed herein. Advantageous developments and configurations of the power conducting system are disclosed herein as well.

The features specified individually herein may be combined with one another in any desired technologically meaningful way and may be supplemented by explanatory facts from the description, with further variant embodiments of the invention being highlighted.

The power conducting system according to the invention comprises at least one power conducting unit for guiding lines, hoses or the like between a stationary connection area and a moving connection area, with a curved region being formed between a lower run and an upper run. The power conducting unit is formed by segments that are connected together in an articulated manner. Some segments have laterally arranged rollers with different track widths. The rollers roll on guides, wherein the guides have cutouts so that rollers can pass through the guides at each particular deflection point of the power conducting unit. The guides form a lateral boundary of a guide channel for the lower run.

As a result of this configuration according to the invention of the power conducting system, it is also possible for long travel distances to be realized, since the frictional forces between the upper run and lower run are considerably reduced by the rollers. Furthermore, with the power conducting system according to the invention, the proposal is made that the system can be realized with simple means. Furthermore, the power conducting system does not require a large amount of space since the height of the power conducting system is determined substantially by the radius of curvature of the curved region. The power conducting system according to the invention also has the advantage that it is possible to guide the lower run through the guide channel.

The guide channel or the guides can also be configured such that lateral guidance of the rollers of the upper run is achieved. Optionally, the guide can have a surface which is profiled. The rollers have a corresponding mating profile, such that in this way, too, guidance of the upper run is achieved.

According to an advantageous configuration of the power conducting system according to the invention, it is proposed that an arrangement of rollers having a narrow track width is provided between two adjacent arrangements of rollers having a wide track width. In particular, it is proposed that each particular spacing of the arrangement of rollers having a narrow track width from the arrangements of rollers having a wide track width is different.

In particular as a result of this arrangement, it is possible for the rollers to be supported on the guide, such that there is no sag of the power conducting unit.

According to a further advantageous configuration of the power conducting system according to the invention, it is proposed that the rollers protrude beyond a longitudinal edge of the power conducting unit with their lateral surfaces. As a result, the upper run and lower run are not in contact. In particular, it is proposed that the height of the guide channel is selected such that the runs do not come into contact. As a result of the running roller diameter and the position of the rollers on the segments, the spacing between the upper run and the lower run can vary for each particular embodiment and application.

The power conducting unit is preferably formed by chain links that are connected together in an articulated manner. It is preferably a power conducting unit. A configuration of the power conducting system in which the rollers are connected detachably to the segments is particularly preferred. This has the advantage that the rollers can be exchanged. Different rollers can also be used. In particular it is also possible to use rollers which have a running surface which is associated with only very little noise generation.

Further advantages and details of the invention are explained by way of the exemplary embodiments illustrated in the figures, without the subject matter of the invention being limited to these exemplary embodiments. In the figures.

Figure 1:
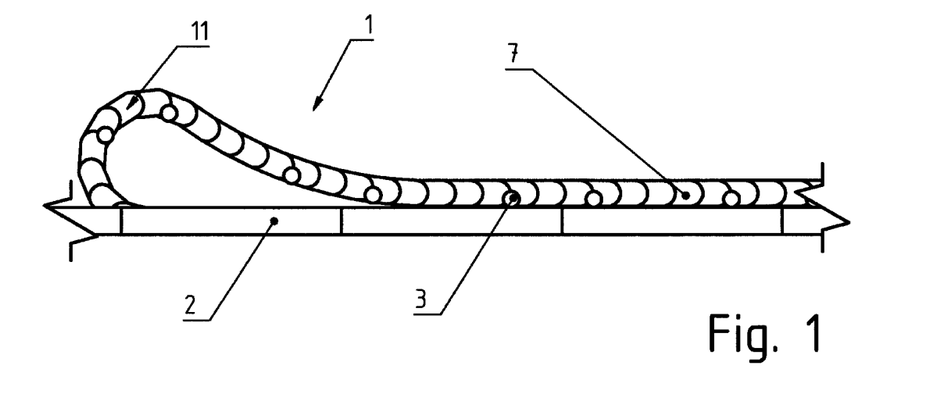
FIG. 1: schematically shows a side view of one exemplary embodiment of a power conducting system.

FIG. 1 schematically shows a side view of one exemplary embodiment of a power conducting system according to the invention. The power conducting system comprises a power conducting unit 1 for guiding lines, cables, hoses or the like between a stationary connection area and a movable connection area, with a curved region 11 being formed. Provision is made of a lower run, which is located behind a guide 2 in FIG. 1, and an upper run 7. The power conducting unit is formed by segments 6 that are connected together in an articulated manner, as is apparent in particular from FIG. 2. Rollers 3 are provided on some segments.

Figure 2:
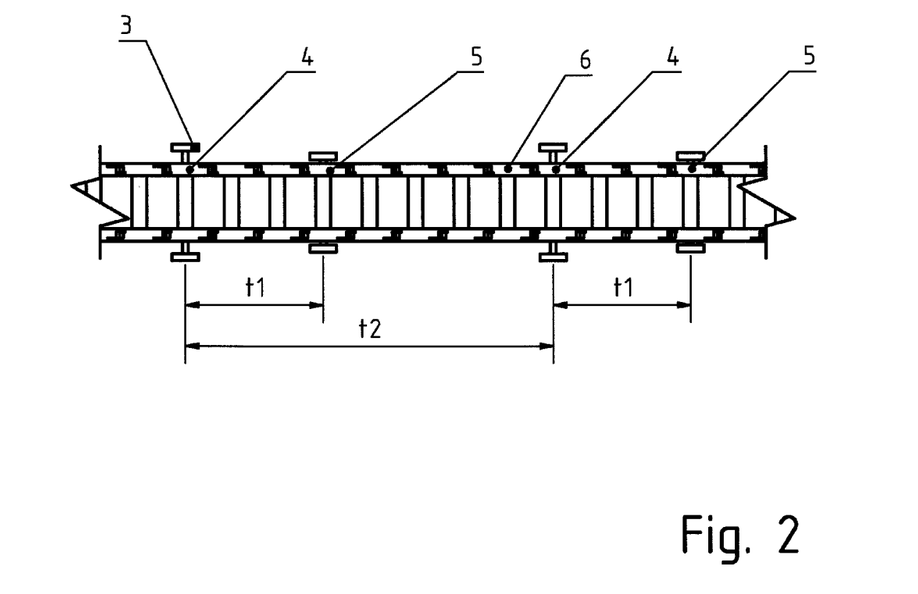
FIG. 2: schematically shows a plan view of a power conducting unit.

FIG. 2 shows a portion of a power conducting unit 1. The power conducting unit 1 is formed by segments 6. In the particular exemplary embodiment, it is a power conducting unit which is formed by chain links that are connected together in an articulated manner. It is apparent from the illustration according to FIG. 2 that rollers 3 are provided on both sides of some segments 6. The reference sign 4 denotes a segment which has a wide track width. The segment 5 has two rollers which are arranged on both sides of the segment and has a narrow track width. A comparison of the track widths of the segments 4, 5 shows that the track widths are different. The track width at the segment 5 is smaller than at the segment 4.

The segments 4, 5 alternate in the longitudinal direction of the power conducting unit 1. The spacing between the segments 4 which have a wide track width is denoted t2 in FIG. 2. The spacing between the segments or between the axles of the rollers of the segments 4, 5 is denoted t1. This arrangement repeats, wherein the spacing t2 is greater than twice t1.

Figure 3:
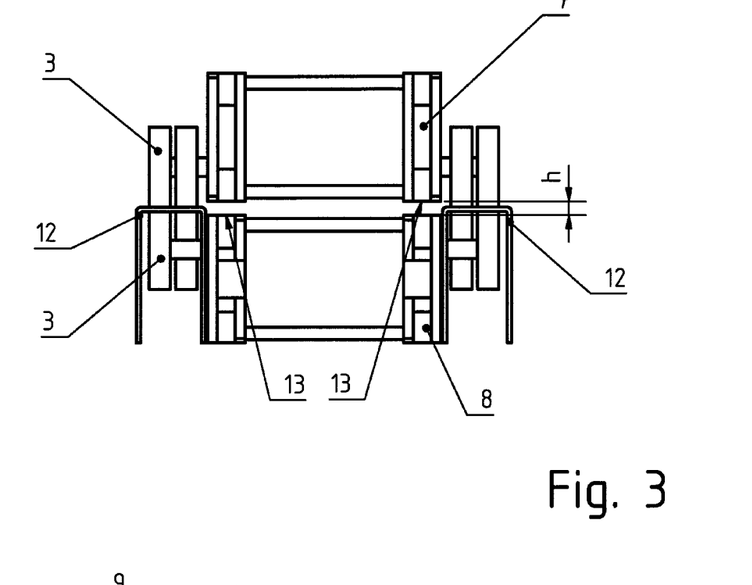
FIG. 3: shows the power conducting system in cross section.

FIG. 3 illustrates the power conducting system in cross section. Arranged on both sides of the lower run 8 are guides 12. The guides 12 have a substantially U-shaped cross section. The width of the guides 12 is dimensioned such that the rollers 3 can be deposited within the U-shaped cross section of the guides 12. The spacing between the lower run 8 and the upper run 7 is denoted "h". The spacing h can be varied by the height of the guide 12 and/or the diameter of the rollers 3. It is apparent from FIG. 3 that the rollers 3 are arranged such that they protrude beyond a longitudinal edge 13 of the power conducting unit 1. This is the self-facing longitudinal edge 13 of the power conducting unit 1.

Figure 4:
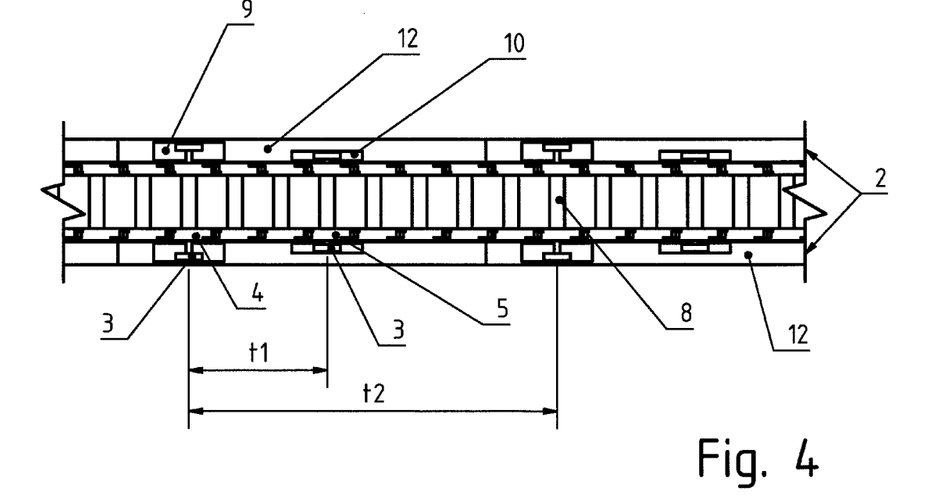
FIG. 4: shows a plan view of the power conducting system.

It is apparent from the plan view of the power conducting system in FIG. 4 that the guides 12, which form the guide channel 2, have cutouts 9, 10. The cutouts 9, 10 are configured such that the rollers 3 can be deposited in the guides 12 when the lower run 8 is deposited. The cutouts 9, 10 are adapted to the track width. The rollers 3 of the upper run 7, which is not illustrated in FIG. 4, can run on the guides 12.

Figure 5:
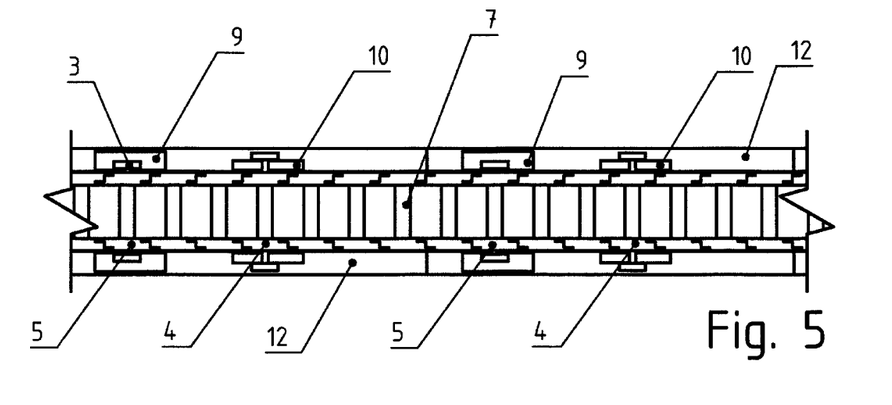
FIG. 5-7: show different positions of the upper run while the latter is being moved.
Figure 6:
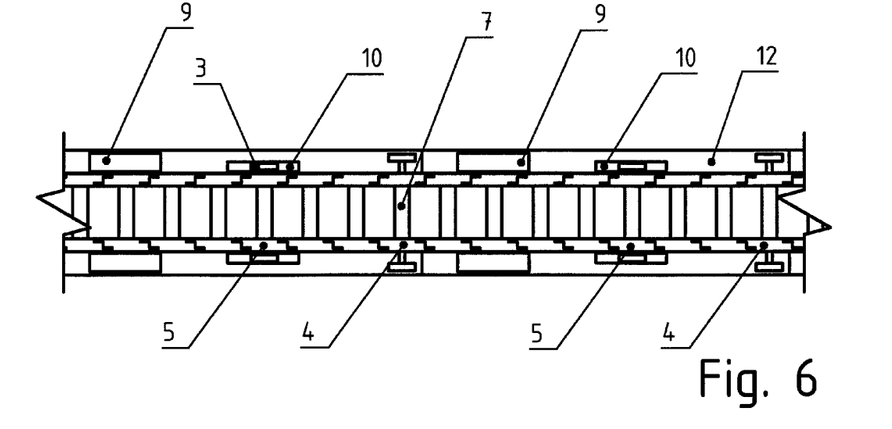
Figure 7:
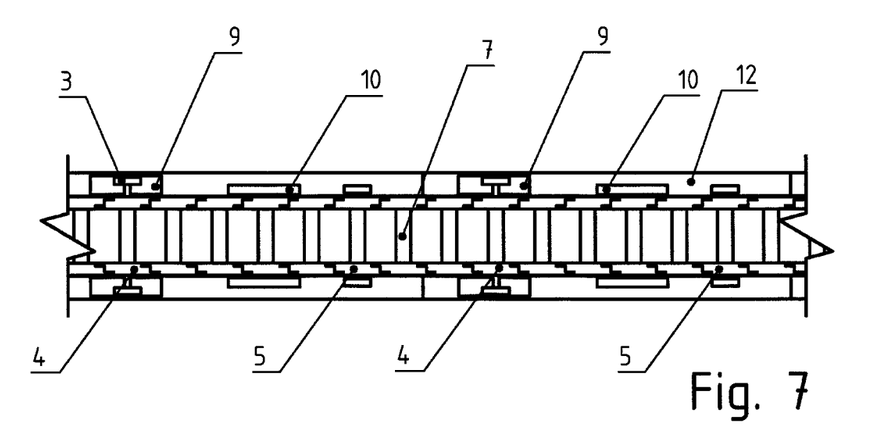

FIG. 5-7 schematically illustrate the sequence of movement of the upper run 7. If the moving end of the power conducting unit is moved, then the upper run 7 moves. The rollers 3 roll on the guides 12. If the deflection point of the power conducting unit 1 reaches particular locations, the rollers pass through the guides 12 and the corresponding segments are deposited as segments of the lower run. It is apparent from the illustrations in FIGS. 5 and 6 that the segments 4 having a wide track can pass into the cutouts 10 in the guides 12, since the extent of the cutouts 10 transversely to the longitudinal direction of the power conducting unit is smaller than the track width of the segments having a narrow track.

Figure 8:
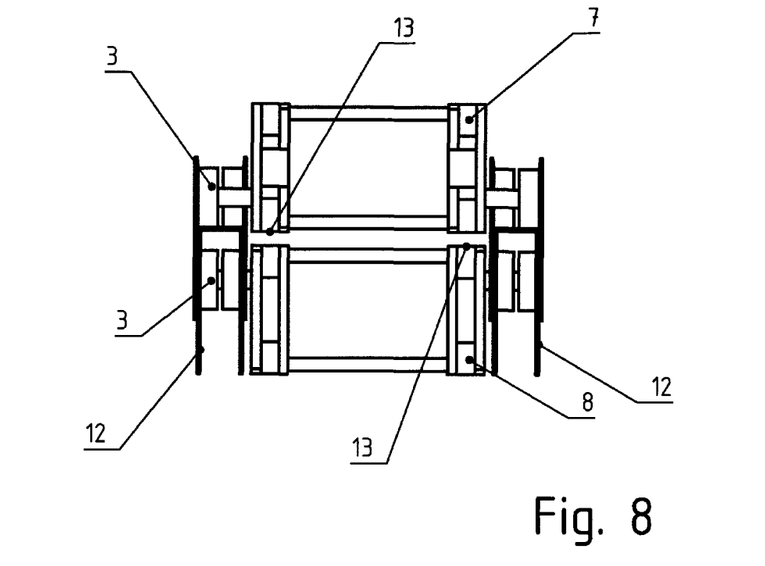
FIG. 8 shows a power conducting system in cross section with flanged rollers.

FIG. 8 illustrates a modified exemplary embodiment of the power conducting system in cross section. Arranged on both sides of the lower run 8 are guides 12. The guides 12 have a substantially U-shaped cross section. The width of the guides 12 is dimensioned such that the rollers 3 can be deposited within the U-shaped cross section of the guides 12. Provided in the guides 12 are window-like cutouts, through and into which the rollers 3 are deposited. The rollers 3 are formed as flanged rollers in the exemplary embodiment illustrated, wherein the flange rests laterally against each particular guide 12, such that the rollers 3 are guided.

Figure 9:
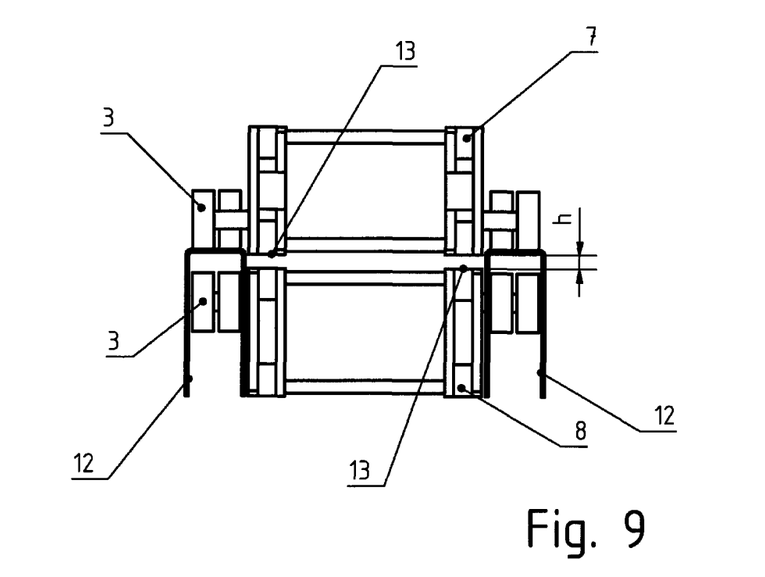
FIG. 9 shows a power conducting system in cross section with lateral guidance of the upper run.

A further modification of the power conducting system is illustrated in FIG. 9. Arranged on both sides of the lower run 8 are guides 12. The guides 12 have a substantially U-shaped cross section, although this is not obligatory. The guides can also preferably be formed in a T-shaped manner, wherein the T-shaped profile has been rotated through 90°. Provided in the guides 12 are window-like cutouts, through and into which the rollers 3 are deposited. The spacing h can be set by the height of the guides 12. Preferably, the rollers 3 are arranged such that the lateral surface thereof ends at a distance from a longitudinal edge 13 and the guides 12 have such a height as to allow lateral guidance of the upper run 7.

Figure 10:
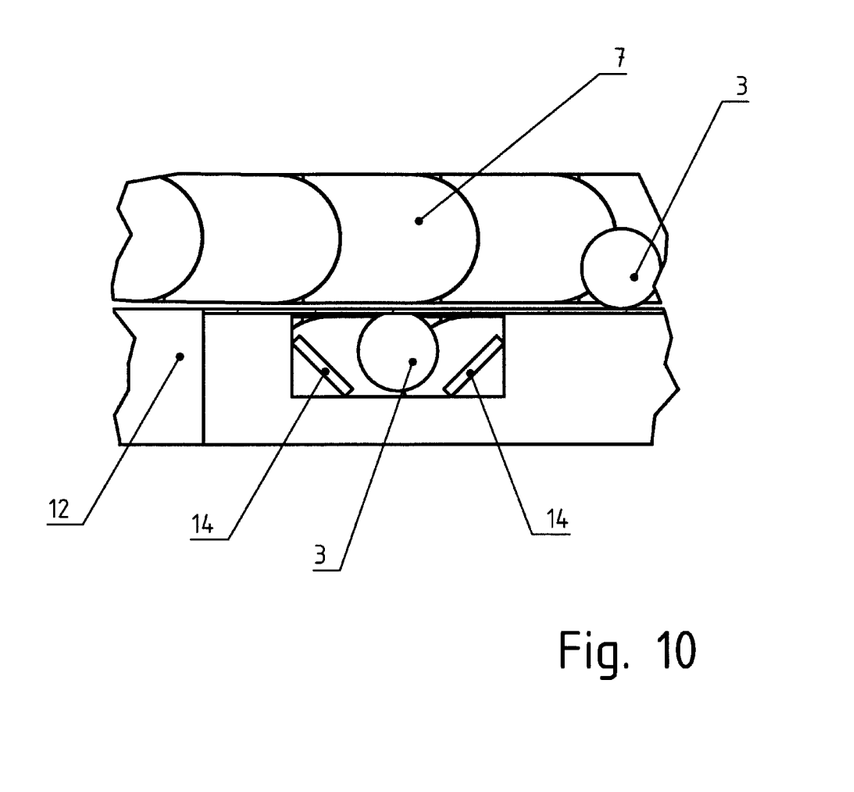
FIG. 10 shows a guide with centering.

FIG. 10 illustrates a guide 12. It has window-like cutouts. It is apparent from the illustration according to FIG. 10 that webs 14 that are arranged in a substantially V-shaped manner are provided within the guide 12 and the cutout. The webs 14 form a compensating unit which is intended to ensure that the power conducting unit always self-centers again when the curved region is deposited. A change in length of the power conducting unit that increases over the lifetime, for example by play or stretching of the power conducting unit, in particular bolt/borehole play, as can occur in the case of a power conducting chain, can thus be compensated and the operational reliability increased.

LIST OF REFERENCE SIGNS

1 Power conducting unit
2 Guide channel
3 Rollers
4 Segment having a wide track
5 Segment having a narrow track
6 Segment
7 Upper run
8 Lower run
9 Cutout for segments having a wide track
10 Cutout for segments having a narrow track
11 Curved region
12 Guide
13 Longitudinal edge
14 Webs

The invention claimed is:

1. A power conducting system comprising:
a power conducting unit for guiding lines or cables between a stationary connection area and a moving connection area, with a curved region being formed between a lower run and an upper run, the lower run (i) being disposed beneath the upper run and (ii) residing closer to a ground surface than the upper run,
said power conducting unit having segments that are connected together in an articulated manner,
wherein some segments have laterally arranged rollers with different track widths, and
guides arranged on both sides of the lower run and defining guide tops,
wherein the rollers with different track widths of the upper run roll on a same outer surface of the guide tops defined by the guides, the outer surface of the guide tops facing the upper run,
wherein the guides have cutouts so that rollers can pass through the cutouts of the guides at each particular deflection point of the power conducting unit,
wherein the guides form lateral boundaries of a guide channel for the lower run, the rollers of the lower run being captured by the guides;
wherein the power conducting unit is formed by chain links that are connected together in an articulated manner;
wherein a respective guide is arranged on each side of the lower run;
wherein spacing between each axle of the rollers and a longitudinal edge of the power conducting unit is constant.

2. The power conducting system as claimed in claim 1, wherein an arrangement of rollers having a narrow track width is provided between two adjacent arrangements of rollers having a wide track width.

3. The power conducting system as claimed in claim 2, wherein each particular spacing of the arrangement of rollers having a narrow track width from the two arrangements of rollers having a wide track width is identical.

4. The power conducting system as claimed in claim 1, wherein the rollers protrude beyond a longitudinal edge of the power conducting unit with their lateral surfaces.

5. The power conducting system as claimed in claim 1, wherein the guides partially overlap the upper run.

6. The power conducting system as claimed in claim 1, wherein the rollers are flanged rollers.

7. The power conducting system as claimed in claim 1, wherein the rollers are connected detachably to the segments.

8. The power conducting system as claimed in claim 1, wherein the guide is formed by at least one U-shaped profile.

9. A power conducting system, comprising:
a set of guides which defines a guide channel and guide tops, and
a power conducting unit that guides a set of cables, the power conducting unit having an upper run, a lower run, and a curved region that connects the upper run to the lower run,
wherein an end portion of the lower run terminates at a stationary connection area,
wherein an end portion of the upper run is movable along the guide tops defined by the set of guides,
wherein the lower run (i) is disposed beneath the upper run and (ii) resides closer to a ground surface than the upper run,
wherein the power conducting unit includes segments that connect in an articulated manner,
wherein some segments have laterally arranged rollers with different track widths,
wherein rollers with different track widths of the upper run roll on a same outer surface of the guide tops defined by the set of guides while the end portion of the upper run moves along the guide tops,
wherein rollers of the lower run are captured within the guide channel defined by the set of guides while the end portion of the upper run moves along the guide tops, and
wherein the guide top has cutouts that enable the rollers to pass through the cutoffs while the end portion of the upper run moves along the guide tops;
wherein the power conducting unit is formed by chain links that are connected together in an articulated manner;
wherein a respective guide is arranged on each side of the lower run;
wherein spacing between each axle of the rollers and a longitudinal edge of the power conducting unit is constant.

10. The power conducting system as claimed in claim 1, wherein the segments of the power conducting unit include a series of chain link portions having shafts with different track widths.

11. The power conducting system as claimed in claim 10, wherein the series of chain link portions includes (i) first chain link portions having first shafts that define a first track width and (ii) second chain link portions having second shafts that define a second track width that is different from the first track width.

12. The power conducting system as claimed in claim 11, wherein the first chain link portions and the second chain link portions are arranged within the series of chain link portions in an alternating manner.

13. The power conducting system as claimed in claim 9, wherein the segments that connect in the articulated manner of the power conducting unit include a series of chain link portions having shafts with different track widths,
wherein the series of chain link portions includes (i) first chain link portions having first shafts that define a first track width and (ii) second chain link portions having second shafts that define a second track width that is different from the first track width, and wherein the first chain link portions and the second chain link portions are arranged within the series of chain link portions in an alternating manner.

* * * * *